Aug. 6, 1935.　　　　D. DILEO　　　2,010,627
FISHING ROD HANDLE AND REEL SUPPORT
Filed Aug. 1, 1934
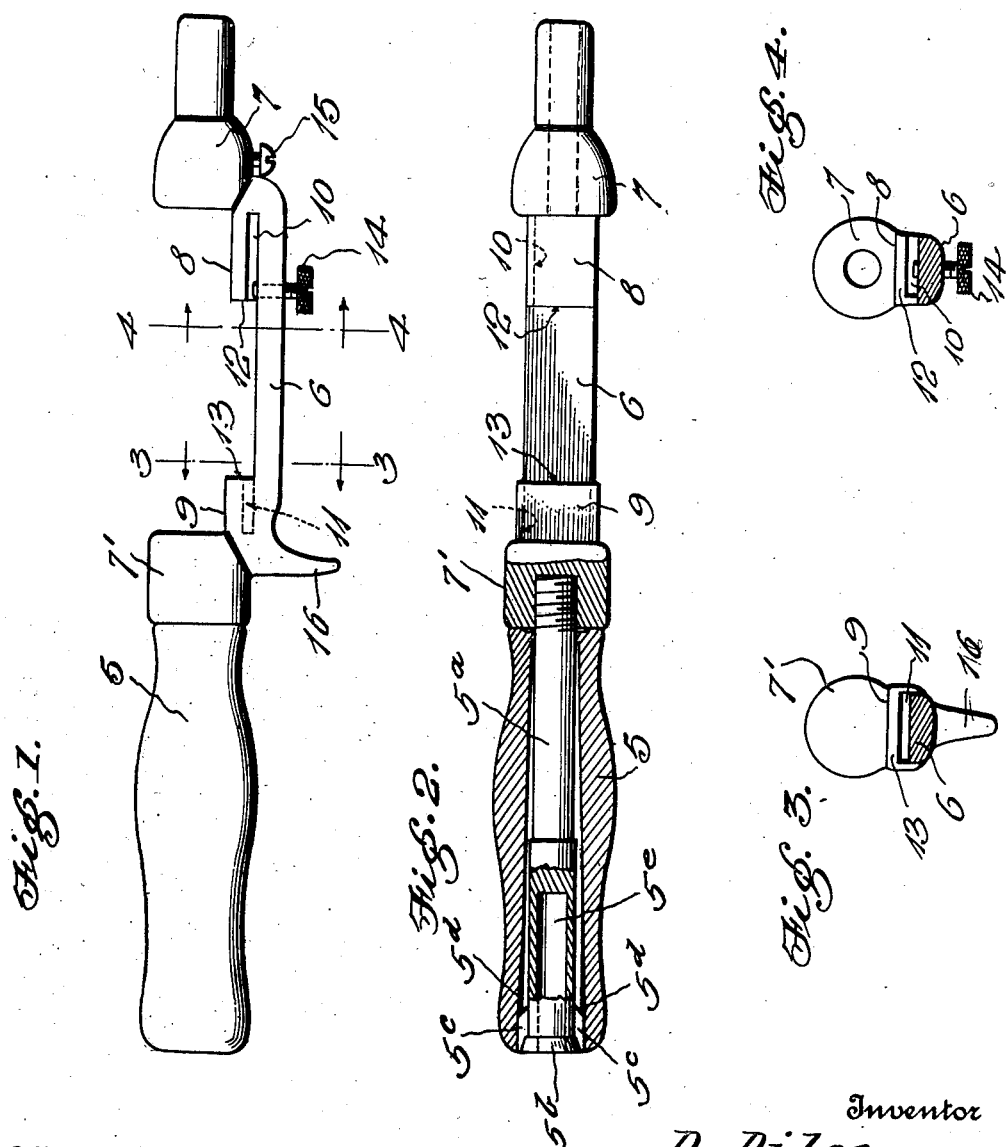
Inventor
D. Dileo
Witness
H. Woodard
By H. B. Willson & Co.
Attorneys.

Patented Aug. 6, 1935

2,010,627

UNITED STATES PATENT OFFICE 2,010,627

FISHING ROD HANDLE AND REEL SUPPORT

Dominick Dileo, Utica, N. Y.

Application August 1, 1934, Serial No. 737,990

3 Claims. (Cl. 43—22)

The invention aims to provide an exceptionally simple and inexpensive, yet an efficient, convenient, well-balanced and durable device constituting both a handle and a reel holder for a fishing rod.

With the foregoing in view, the invention resides in the novel subject matter hereinafter described and claimed, description being accomplished by reference to the accompanying drawing.

Fig. 1 is a side elevation.

Fig. 2 is a top plan view partly in horizontal section.

Figs. 3 and 4 are transverse sectional views on lines 3—3 and 4—4 of Fig. 1.

A preferred structure has been shown and will be specifically described, but within the scope of the invention as claimed, minor variations may be made.

The entire device, exclusive of the handle 5 and its attaching means, is preferably cast in one piece from aluminum or other light metal. The horizontally elongated reel rest 6 is provided at its rear end with an integral upwardly projecting handle-attaching lug 7', and the lower portion of a rod socket 7 is integral with the front end of said reel rest. The handle 5, of aluminum, metal-lined cork or any other desired material, abuts the lug 7' and is secured to it by a longitudinal screw 5ª which passes through said handle and is threaded into said lug, the screw being provided with a tapered head 5ᵇ fitted snugly into the rear end of the handle. Ribs 5ᶜ are formed in the screw adjacent the head 5ᵇ and are received in grooves 5ᵈ in the handle, so connecting screw and handle that rotation of the latter will tighten or loosen said screw. The handle 5 may therefore be readily detached for substitution of a different handle, if desired, and the fisherman may easily disconnect said handle to facilitate carrying of the entire device in his pocket. The rear end of screw 5ª is formed with a socket 5ᵉ, and the rod may be inserted into this socket instead of into socket 7, if preferred. The front and rear ends of the rest 6 are upwardly thickened, providing upward steps 8 and 9 which are integral with the lug 7' and socket 7 respectively, and provide a surplus of metal at the junctures of these parts with said reel rest 6, to well withstand all strains encountered during use. The steps 8 and 9 are provided with rectangular recesses 10 and 11 respectively, opening through the riser portions 12 and 13 of said steps to receive the ends of a conventional reel base. The socket 10 also opens laterally to permit insertion of the front end of the reel base after the rear end has been inserted in the recess 11, and to permit removal of said front end of said base ahead of removal of the rear end of the base from the recess 11. A set screw 14 is upwardly threaded through the reel rest 6 to clamp the front end of the reel base in the recess 10, and another set screw 15 may well be employed to secure the rod in the rod socket 7. Friction however, may be relied upon to hold the rod either in socket 7 or socket 5ᵉ.

The rear end of the reel rest 6 is preferably provided with a downwardly projecting hook 16 for engagement with the user's forefinger to facilitate firm and anti-slipping holding of the handle 5.

It will be seen from the foregoing that the device is exceptionally simple and inexpensive, yet that it will be efficient, convenient and durable. The device when constructed in the specific manner shown, has proven desirable from all standpoints and this specific structure is therefore preferably followed. Attention however, is again invited to the possibility of making minor variations within the scope of the invention as claimed.

I claim:—

1. A fishing rod handle and reel support comprising an elongated reel rest having an integral upwardly projecting handle-attaching lug at its rear end, a handle secured to said lug, a rod socket whose lower portion is integral with the front end of said reel rest, the front and rear ends of said reel rest being upwardly thickened and providing upward steps which are integral with said rod socket and said handle-attaching lug respectively, said steps having recesses opening through their riser portions to receive the ends of a reel base, one of said recesses being also open laterally, and a set screw threaded upwardly through said reel rest for clamping the reel base in said one recess.

2. In a device of the class described, a reel support, a tubular handle abutting an end of said support, and a screw passing through said handle and threaded into said support, the end of said screw remote from said support having a rod socket.

3. A fishing rod handle and reel support comprising an elongated reel rest having an integral upwardly projecting handle-attaching lug at its rear end, a handle secured to said lug, a rod socket whose lower portion is integral with the front end of said reel rest, the front and rear ends of said reel rest being upwardly thickened and providing upward steps which are integral with said rod socket and said handle-attaching lug respectively, said steps having recesses opening through their riser portions to receive the ends of a reel base, one of said recesses being also open laterally, and means for holding the reel base in said one recess.

DOMINICK DILEO.